March 7, 1967 W. A. BRIGGS 3,307,615
SUN CONTROL DEVICE

Filed July 29, 1964 3 Sheets-Sheet 1

INVENTOR.
WILLIAM A. BRIGGS
BY

March 7, 1967 W. A. BRIGGS 3,307,615
SUN CONTROL DEVICE
Filed July 29, 1964 3 Sheets-Sheet 2

INVENTOR.
WILLIAM A. BRIGGS
BY

March 7, 1967     W. A. BRIGGS     3,307,615

SUN CONTROL DEVICE

Filed July 29, 1964     3 Sheets-Sheet 3

INVENTOR.
WILLIAM A. BRIGGS
BY

United States Patent Office 3,307,615
Patented Mar. 7, 1967

3,307,615
SUN CONTROL DEVICE
William A. Briggs, 408 W. Grace St.,
Richmond, Va., 23220
Filed July 29, 1964, Ser. No. 385,997
6 Claims. (Cl. 160—181)

This invention relates to a novel apparatus and device to be utilized in the control of the amount of solar energy, in the form of direct heat rays and in the form of direct light rays which will be admitted through building openings such as porches, windows and other openings which are presently freely transmitting direct sun rays. It is particularly intended to intercept the light rays and diffract or disperse them while at the same time providing a barrier to prevent the heat rays from acting upon transparent or translucent materials such as glass and plastics used in glazing windows with the result that the glazing material will not become a secondary heat source thus raising the temperature within an enclosure which is receiving directly the radiant heat from the sun's rays as well as the heat generated by the glazing material which has already been heated by the unintercepted sun rays. This effect is sometimes termed the "hot-house phenomena" and is well-known to florists and air-conditioning engineers. Even in the presence of low outside temperatures a glazed enclosure can achieve a high temperature if subjected to the direct rays of the sun for an appreciable length of time.

In searching for savings in operating costs through reduced heat gain through openings, architects and manufacturers have developed fixed fins, overhangs, and recently, electronically controlled movable louvers whose primary purpose is to intercept the direct rays of the sun before they can enter the building or heat up the glass. The available commercial products for the control of heat gain for the home-owner, for the owner of small commercial buildings, or for the owner of older commercial buildings fall broadly in the following categories:

(1) Venetian blinds (adjustable, horizontal slats inside the building);
(2) Interior vertical blinds operationally similar to venetian blinds;
(3) The old, familiar slatted window shutters, blinds or jalousies;
(4) Fabricated screens wtih small angled horizontal elements; and
(5) Various, expensive awnings and custom designed interceptors.

Items 1 and 2 mentioned above do not perform the function of preventing heat gain because the sun's rays are already inside the building before they can be intercepted. In this case the sun has already heated the glass before being blocked by the blind, but the glass continues to act as a secondary source of heat thus magnifying the effect of the sun's direct rays on the blind which then becomes a tertiary source of heat, all acting radiantly or by convection to raise the interior temperature and humidity.

Items 3, 4 and 5 set forth above, being applied exteriorly, serve this function but are limited in size, flexibility, durability, and in application. The device to be effective in the control of heat gain must be mounted externally of the building shell in order to intercept and deflect the sun's rays before they penetrate the building structure and release their radiant heat.

It is to the above-discussed field of sun control and heat gain control that this invention relates. It is, therefore, an object of the present invention to provide a device which will reduce heat gain without blocking out natural light, but rather reduce heat gain by increasing the overall foot-lamberts through difussion and refraction of the light rays.

It is a further object to provide a device which will attain a cut-off angle sufficient to elimiate the direct rays of the sun during the hottest hours, namely, 9:00 a.m. to 4:00 p.m., through the five hottest months, April through August. In attaining this cut-off angle for most of the densely populated latitudes of the world, it is determined astronomically that approximately 30 degrees will provide an optimum function. It is a further object to provide an adjustable device which will allow inside-outside viewing when desired but will also provide additional privacy when desired, although the invention is commercially feasible and entirely complete without the feature of adjustability. It is a further object to provide a device which is weather-proof, inherently durable, and maintenance free to economically justify its cost and installation expense. It is a further object to provide a device which will comprise a minimum number of components, each of which will be of a uniform size or length. These components should be shippable in bulk, require a minimum of packaging and handling in merchandising, and yet be capable of being easily customized to fit any size opening in a building structure. It is a further object to provide a device which can be quickly assembled by persons of unskilled capability in order to provide quick, easy installation. It is a further object to provide a device in which the components will be the same for all sections of the country so that distribution, national advertising, and direct sales displays may be uniform. It is a further object to provide a device inherently designed to require a minimum number of operations in fabrication, packaging and installation; to require no detailed inspection; and to produce a product of uniformly high quality adaptable to the intended use.

With the foregoing and ancillary objects in view, we propose to effect an embodiment of our invention as follows: the present invention is concerned primarily with a device comprising two side support members to be vertically mounted on the vertical sides of a building aperture. These side members are horizontally slotted at regular intervals. These side members when mounted on the building provide a series of slots which are adapted to receive a tape member which may be conveniently laced therebetween in serpentine fashion to form louver strips. This tape member will be attached either to the support or to an adjacent louver-strip thereof in a manner to anchor the end of the tape member at the top and bottom of each installation to prevent the shifting thereof. The features of improvement of the present invention over prior art devices will be readily apparent when the drawings appended hereto are considered in the light of the following specification.

The refinements of construction and detail of operation characterized by the present invention although not touched upon in the foregoing general outline will be clearly understood from the following description when read in conjunction with the accompanying drawings in which illustrative embodiments of the invention are disclosed by way of example. It is to be expressly understood, however, that the drawings are for the purpose of illustration and description only and do not define the limitations of the invention.

In the drawings:
FIG. 1 is a front elevational view of one embodiment of the shade apparatus of the present invention;
FIG. 2 is a sectional side elevational view thereof;
FIG. 3 is a sectional top plan view thereof;
FIG. 4 is an enlarged sectional view of the attaching clip portion thereof;
FIG. 5 is a front elevational view of another embodiment of the invention;
FIG. 6 is a sectional side elevational view thereof;
FIG. 7 is a sectional top plan view thereof;

Figure 3:
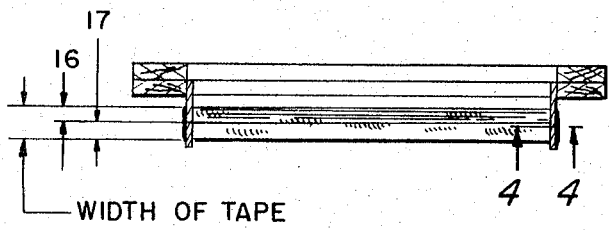

In the following description and in the claims, various details will be identified by specific means for convenience, but they are intended to be as generic in their application as the art will permit. Like reference characters denote like parts in the several figures of the drawings. In the drawings accompanying and forming part of this specification, specific disclosure of the invention is made for purposes of explanation, but it will be understood that the details thereof may be modified in various respects without departure from the broad aspect of the invention.

Figure 1:
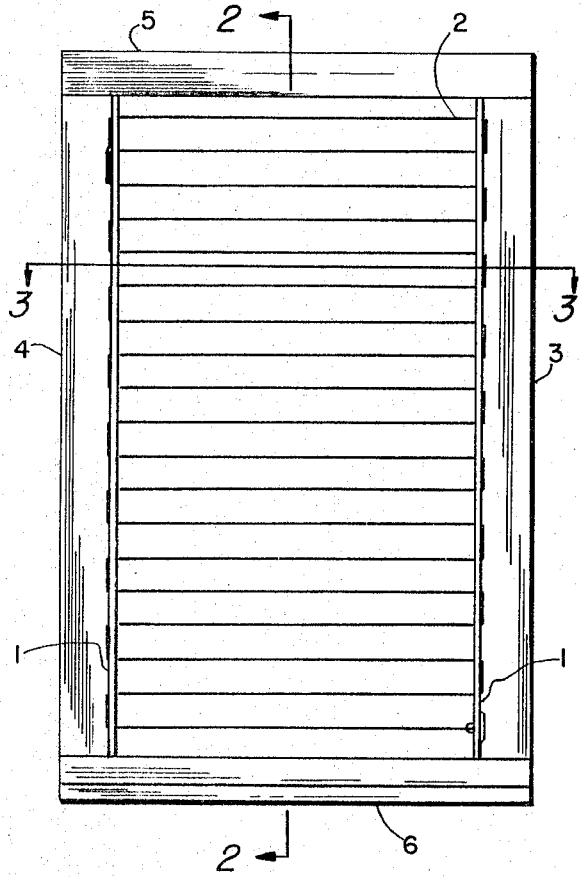
Figure 2:
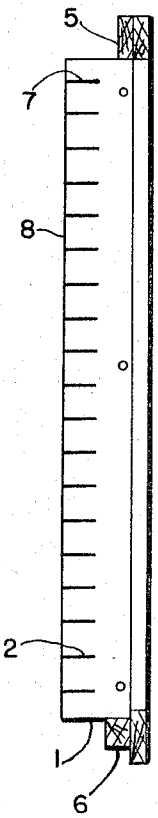
Figure 7:
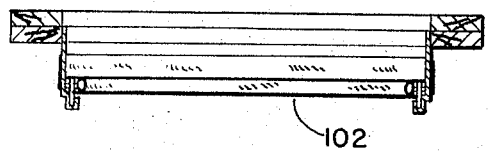

Referring now to the drawings, and more particularly to FIGURES 1 to 3, one embodiment of applicant's device is shown installed on a conventional window opening of a building structure. The conventional portions of the window structure are shown somewhat diagrammatically, it being understood that the flange portions of applicant's device may be formed to be compatible with any of the multitude of window frame structures and other frame structures surrounding any opening in a building. Most window opening structures—better called frames, consist of a lower horizontal member normally termed the sill member, a left and right side vertical member termed the jamb, and an upper member, normally similar in cross-section to the jamb member and termed the head member. This is true of most frames regardless of material, the variations occurring in the type of sash and material which is used.

Applicant's device is shown attached to the left and right vertical frame members to produce a horizontal slatted sun interceptor but may also be attached to the head and sill members to effect a vertical slatted interceptor. In either attitude the flanges of applicant's device are adapted to be mounted by nail, screw, clip, fastener or adhesive, for either vertical or horizontal use.

Referring further to FIGS. 1 to 3, applicant's apparatus comprises, in general, a pair of suitable supporting elements 1, and a continuous length of tape 2. Elements 1 may be attached to the right vertical support or jamb 3 and the left vertical support or jamb 4 of a conventional window opening, or alternatively to the horizontal upper or head member 5, and the horizontal lower or sill member 6. Each of supporting elements 1 includes a series of regularly spaced slots 7 fabricated at substantially right angles to external edge 8. It will be clear that the tape 2 can be anchored by attaching one end thereof to either the bottom or top of a supporting element 1 and that once one end of tape 2 has been anchored to one supporting element 1, that it may be laced in serpentine fashion between the two supporting elements 1 to form a multiplicity of slats that are relatively resilient rather than rigid, and the other end attached to either an element 1 or a section of tape 2. The simplest embodiment of the invention is shown in FIGURES 1 to 3 wherein supporting elements 1 are flat, rectangular members of uniform thickness which have been slotted at regular intervals at right angles to the external edge 8 thereof. In addition, supporting elements 1 are adapted to be drilled or slotted to provide holes or slots to facilitate the installation thereof on the jambs of the frame of an opening. Further, in this simplest embodiment, tape 2 may be formed of translucent or opaque material of the least costly composition which will withstand weathering. It will be apparent that this simplest embodiment of the invention provides only horizontal slats which will economically feasible in many commercial, residential and institutional installations. However, for a more refined embodiment of the invention, reference is now made to FIGURES 5 to 8 showing each supporting element 101 as having an off-set, channel-shaped section 10 at the external edge thereof. This configuration will permit the insertion of a regulator 11 within channel-shaped section 10 after tape 102 has been laced across elements 101 thereby effectively locking tape 102 within slots 107. Regulator 11 is an elongated rectangular thin plate with notches 15 along the edge thereof, spaced at intervals corresponding to the spacing of slots 107 in elements 101. When notches 15 are centered on the portions of tape passing through slots 107, the tape is not deflected, but when the regulator 11 is raised or lowered, one edge of notches 15 will bear against one side of tape 102 and bend each of the sections of tape 102 through an angle corresponding to the angle of notch 15. It will be apparent that if the depth of slot 13 is selected to be the same as the width of tape, plus the dimension shown in FIGURE 8 as 14, that when regulator 11 is inserted in channel section 10 that tape 102 will be momentarily deflected and thereafter retained in alignment, and securely locked within the assembly. Further, it will be apparent that regulator 11 may be formed with notches having any angular configuration, but it has been empirically determined that 45 degree notches both above and below the horizontal provide an optimum configuration for this assembly.

Figure 8:
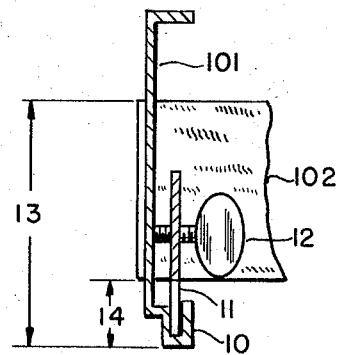
FIG. 8 is an enlarged sectional view of the locking portion thereof.
Figure 5:
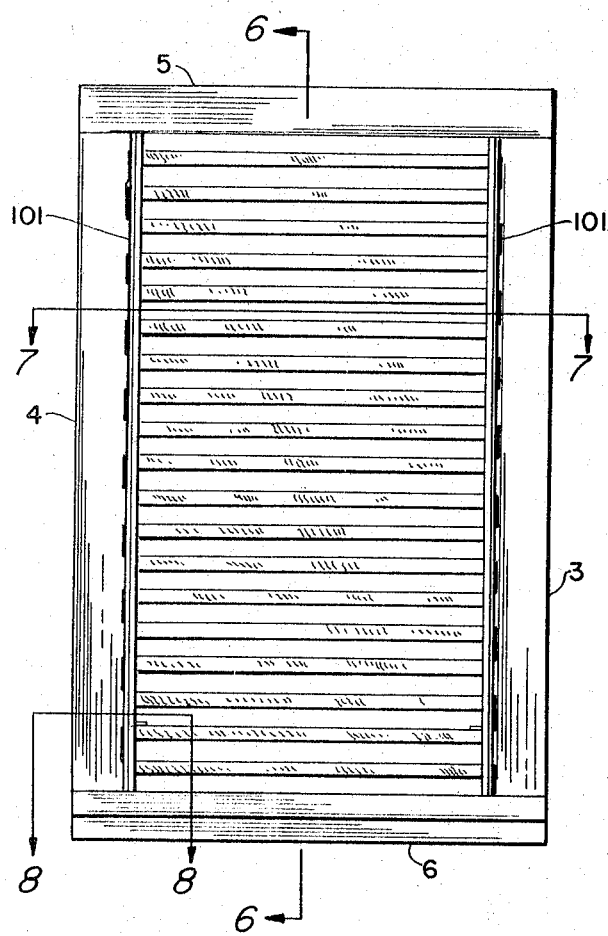
Figure 6:
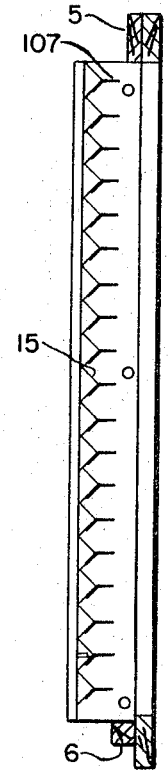

Referring to FIGURE 8, regulator 11 will be provided with a locking means 12 which may conveniently be a thumb screw or set screw which will be retained within a threaded fastener attached to regulator 11 which will securely lock regulator 11 to its associated supporting element 101 in any desired vertical position to provide the desired horizontal bend in the tape. It has been experimentally determined that available commercial woven or extruded plastic and other fibre tapes are resilient and elastic enough to be distorted by regulator 11 as shown, and yet be rigid enough to maintain their operative shape. However, for some types of installation it may be desired to utilize special tapes having a combination of characteristics. As more clearly shown in FIGURE 3, these tapes may comprise two portions longitudinally arranged so that the tape, when it is assembled on applicant's device, will have an inner portion 16 having the characteristic of comparative rigidity, and an outer portion 17 having the characteristics of elasticity and flexibility. This may be accomplished in various ways. Exemplary of these special duty tapes would be tapes which are specially woven in which the warp threads would be spaced closer together; be of larger diameter; or be of stiffer material in the portion 16 than in the portion 17 as shown in FIGURE 3. It will be clearly understood that tapes and fabrics are well known employing these reinforcing fibers or warp elements having stiffening characteristics with uniform weft elements. Further, as an additional immprovement over the embodiments disclosed in FIGS. 1 to 8, FIGS. 9 to 12 illustrate flange and supporting element edge configurations which facilitate the attachment of applicant's support elements to building structures, and enhance the rigidity of the structure by providing a head portion 18 or 18' running vertically on the external edge of supporting elements 201 or 301. This head or bulb portion 18 or 18' may either be solid or have a slot 19 running longitudinally therethrough. In the event that a bulb portion is provided thereon, a channel portion may be provided also in order that a rigid element may be clipped or slip-fitted around bulb portion 18 or 18' in order to reinforce the longitudinal rigidity of the completed assembly.

Figure 9:
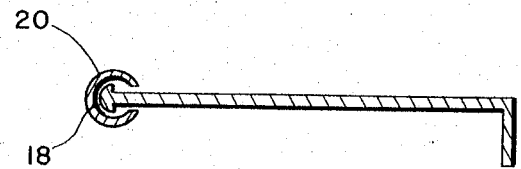
FIG. 9 is a cross-sectional view of one embodiment of the supporting member and retaining element thereof.
Figure 10:
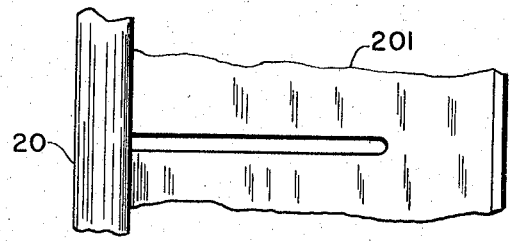
FIG. 10 is a fragmentary elevational view of the elements of FIG. 9.

Referring now to FIGS. 9 and 10, supporting element 201 has a longitudinal head portion 18 running along the external edge thereof and a rigid cylindrical stiffener 20 slipped thereover after assembly to improve the rigidity of the assembly.

Figure 11:
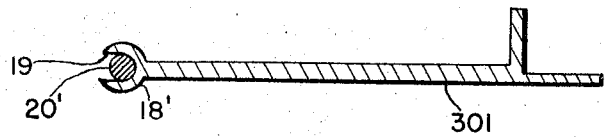
FIG. 11 is a cross-sectional view of a second embodiment of the supporting member thereof.
Figure 12:
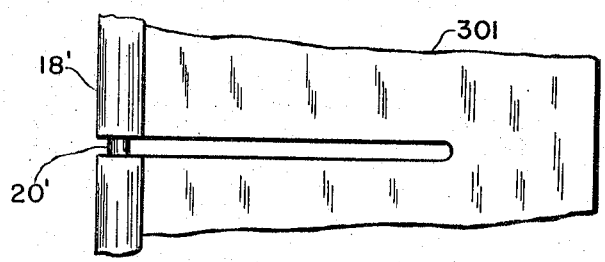
FIG. 12 is a fragmentary elevational view of the element of FIG. 11.

Referring now to FIGS. 11 and 12, supporting element 301 has a longitudinal head portion 18′ running along the external edge thereof and a small rod type stiffner 20′ inserted therein. It will be clear that either element 18 or 20 or 18′ or 20′ may be deformed to retain their relative positions, by simple crimping or other well known means.

Figure 4:
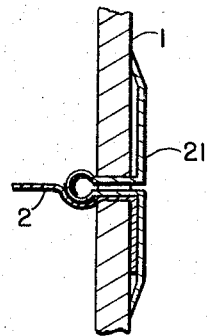

Referring now to FIG. 4, a spring clip 21 is shown with which to attach the end of tape 2 to supporting element 1. Clip 21, comprising two right angle portions slightly angled and connected by a cylindrical spring hinge portion, is found to be a convenient means with which to fasten the end of the tape 2. However, tape 2 may be glued or otherwise fastened to either supporting element 1 or to a section of the tape adjacent to the end thereof in overlapping relation.

The invention has been described in connection wtih exemplary embodiments thereof, but it is to be understood that these embodiments are given by way of illustration, and not limitation; changes and modifications in the details of the apparatus can be made by those skilled in the art without departing from the spirit of the invention as defined in the appended claims.

I claim:

1. A shade device comprising, in combination: a building opening having a surrounding frame portion, said frame portion being of a generally rectangular configuration and comprising a pair of substantially parallel vertical members; a pair of elongated generally rectangular supporting elements of substantially uniform thickness, each of said supporting elements housing two elongated edges, one of said supporting elements being fixedly mounted on one of said parallel members with one of the elongated edges thereof being aligned therewith and the other elongated edge being an external edge, and the other of said supporting elements being fixedly mounted on the other of said parallel members with one of the elongated edges thereof being aligned therewith and the other elongated edge being an external edge, each of said supporting elements having a series of similarly spaced aligned slots, said slots oriented substantially perpendicular to said external edge of said supporting element; and a continuous length of flat, resilient tape, said tape laced in serpentine fashion to provide a straight length of tape extending from each slot in one of said supporting elements to the similar slot in the other of said supporting elements, said tape fastened in a manner to prevent shifting of said tape with respect to said supporting elements, whereby said tape forms a series of spaced resilient louver portions extending across said opening.

2. A shade device comprising, in combination: a building opening having a surrounding frame portion, said frame portion being of a generally rectangular configuration and comprising a pair of substantially parallel vertical members; a pair of elongated generally rectangular supporting elements of substantially uniform thickness, one of said supporting elements being fixedly mounted one one of said parallel members with one of the elongated edges thereof being aligned therewith and the other elongated edge being an external edge, and the other of said supporting elements being fixedly mounted on the other of said parallel members with one of the elongated edges thereof being aligned therewith and the other elongated edge being an external edge, each of said supporting elements having an enlarged head portion extending along said external edge and having a series of similarly spaced aligned slots, said slots oriented substantially perpendicular to said external edge of said supporting elements; a hollow elongated stiffner positioned around said head portion and fastened thereto; and a continuous length of flat, resilient tape, said tape laced in serpentine fashion to provide a straight length of tape extending from each slot in one of said supporting elements to the similar slot in the other of said supporting elements, said tape fastened in a manner to prevent shifting of said tape with respect to said supporting elements, whereby said tape forms a series of spaced resilient louver portions extending across said opening and said stiffner serves to secure said tape within said slots.

3. A shade device comprising, in combination: a building opening having a surrounding frame portion, said frame portion being of a generally rectangular configuration and comprising a pair of substantially parallel vertical members; a pair of elongated generally rectangular supporting elements of substantially uniform thickness, one of said supporting elements being fixedly mounted on one of said parallel members with one of the elongated edges thereof being aligned therewith and the other elongated edge being an external edge, and the other of said supporting elements being fixedly mounted on the other of said parallel members with one of the elongated edges thereof being aligned therewith and the other elongated edge being an external edge, each of said supporting elements having an enlarged head portion extending along said external edge and having a series of similarly spaced aligned slots, said slots oriented substantially perpendicular to said external edge of said supporting element, and said head portion having an internal groove therein parallel to said external edge; a continuous stiffner rod positioned within said groove and fastened to said head portion; and a continuous length of flat, resilient tape, said tape laced in serpentine fashion to provide a straight length of tape extending from each slot in one of said supporting elements to the similar slot in the other of said supporting elements, said tape fastened in a manner to prevent shifting of said tape with respect to said supporting elements, whereby said tape forms a series of spaced resilient louver portions extending across said opening.

4. A shade device comprising, in combination: a building opening having a surrounding frame portion, said frame portion being of a generally rectangular configuration and comprising a pair of substantially parallel members; a pair of elongated generally rectangular supporting elements, one of said supporting elements being fixedly mounted on one of said parallel members with one of the elongated edges thereof being aligned therewith and the other elongated edge being an external edge, and the other of said supporting elements being fixedly mounted on the other of said parallel members with one of the elongated edges thereof being aligned therewith and the other elongated edge being an external edge, each of said supporting elements having a series of similarly spaced aligned slots, said slots oriented substantially perpendicular to said external edge of said supporting element, each of said supporting elements having a channel-shaped section formed along said external edge; a pair of flat elongated generally rectangular regulators, each of said regulators having a series of notches along one of the elongated edges thereof, the center-to-center spacing of said notches being similar to the spacing of said slots, and one of said regulators being retained within each of said channel-shaped sections; and a continuous length of resilient tape, said tape laced in serpentine fashion to provide a length of tape extending from each slot in one of said supporting elements to the similar slot in the other of said supporting elements, said tape fastened in a manner to prevent shifting of said tape with respect to said supporting elements, whereby said tape forms a series of spaced resilient louver portions extending across said opening, and said regulator acts as a retainer to secure said tape within said slots.

5. A shade device comprising, in combination: a building opening having a surrounding frame portion, said frame portion being of a generally rectangular configuration and comprising a pair of substantially parallel vertical members; a pair of elongated generally rectangular supporting elements of substantially uniform thickness, one of said supporting elements being fixedly mounted on one of said parallel members with one of the elongated edges thereof being aligned therewith and the other elongated edge being an external edge, and the other of said supporting elements being fixedly mounted on the other of said parallel members with one of the elongated edges thereof being aligned therewith and the other elongated edge being an external edge, each of said supporting elements having an enlarged head portion extending along said external edge and having a series of similarly spaced aligned slots, said slots oriented substantially perpendicular to said external edge of said supporting element; and a continuous length of flat, resilient tape, said tape laced in serpentine fashion to provide a straight length of tape extending from each slot in one of said supporting elements to the similar slot in the other of said supporting elements, said tape fastened in a manner to prevent shifting of said tape with respect to said supporting elements, whereby said tape forms a series of spaced resilient louver portions extending across said opening.

6. A shade device comprising, in combination: a building opening having a surrounding frame portion, said frame portion being of a generally rectangular configuration and comprising a pair of substantially parallel members; a pair of elongated generally rectangular supporting elements, one of said supporting elements being fixedly mounted on one of said parallel members with one of the elongated edges thereof being aligned therewith and the other elongated edge being an external edge, and the other of said supporting elements being fixedly mounted on the other of said parallel members with one of the elongated edges thereof being aligned therewith and the other elongated edge being an external edge, each of said supporting elements having a series of similarly spaced aligned slots, said slots oriented substantially perpendicular to said external edge of said supporting element, each of said supporting elements having a channel-shaped section formed along said external edge; a pair of flat elongated generally rectangular regulators, each of said regulators having a series of large V-shaped notches along one of the elongated edges thereof, the center-to-center spacing of said notches being similar to the spacing of said slots, and one of said regulators being retained within each of said channel-shaped sections; and a continuous length of resilient tape, said tape laced in serpentine fashion to provide a length of tape extending from each slot in one of said supporting elements to the similar slot in the other of said supporting elements, said tape fastened in a manner to prevent shifting of said tape with respect to said supporting elements, and each of said regulators fastened to its respective supporting element, said notches displaced with respect to said slots, one side of each notch bearing against and deforming said tape to bend said tape through an angle formed by the intersection of one side of said notch and one of said slots, whereby said tape forms a series of spaced resilient bent louver portions extending across said opening, and said regulator acts as a retainer to secure said tape within said slots.

References Cited by the Examiner

UNITED STATES PATENTS

| | | | |
|---|---|---|---|
| 789,596 | 5/1905 | Elgood | 52—667 X |
| 825,631 | 7/1906 | Agnew | 52—667 X |
| 2,491,707 | 12/1949 | Boyden | 160—371 X |
| 2,520,272 | 8/1950 | Bopp et al. | 20—62 X |
| 2,548,512 | 4/1951 | Bergstrom | 20—63 X |
| 2,852,071 | 9/1958 | Smith | 20—63 X |
| 2,887,153 | 5/1959 | Longley | 160—166 |
| 3,014,524 | 12/1961 | Rembert | 160—184 X |

HARRISON R. MOSELEY, *Primary Examiner.*

D. L. TAYLOR, *Assistant Examiner.*